L. H. FLANDERS.
AUTOMATIC LOAD ADJUSTER.
APPLICATION FILED MAR. 15, 1909.
1,168,263.
Patented Jan. 11, 1916.
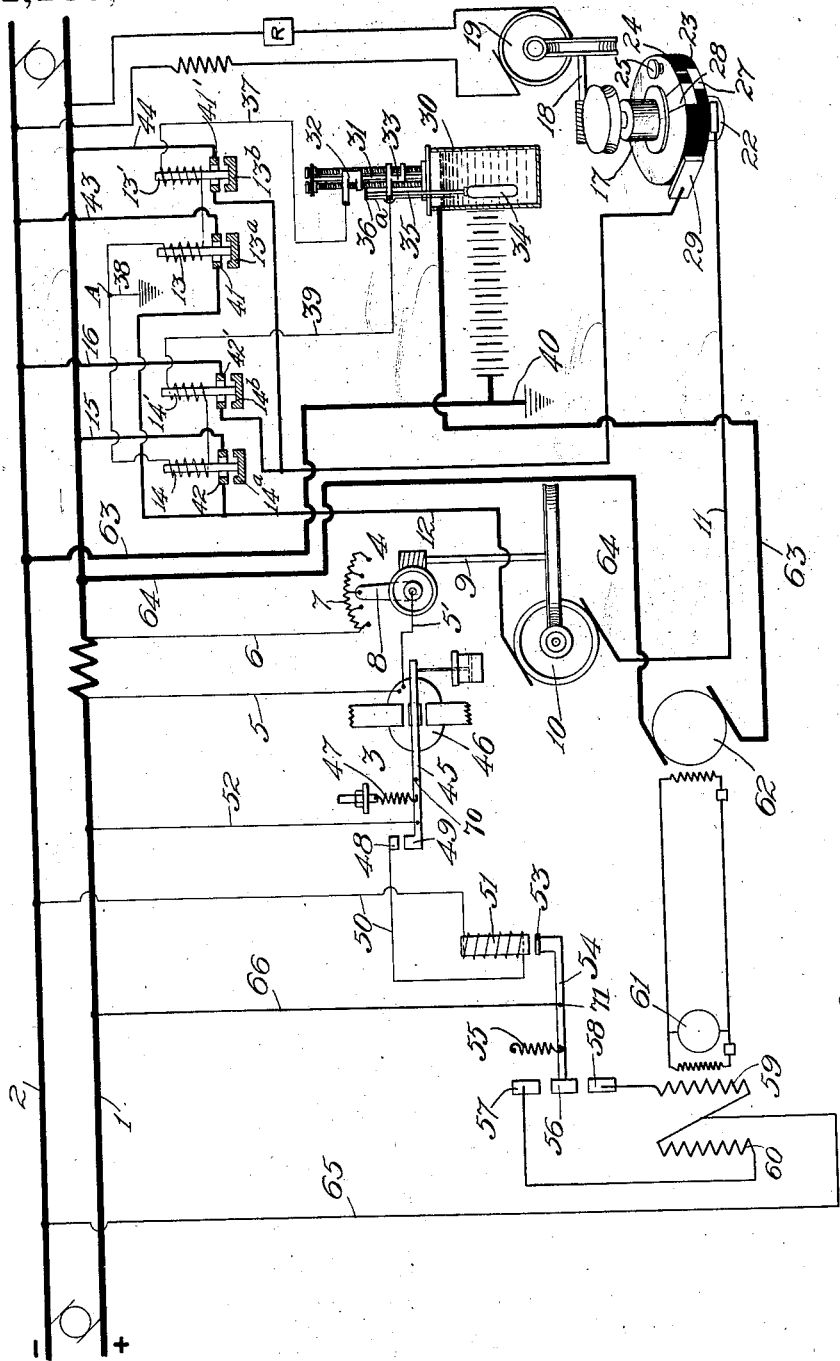
WITNESSES:
INVENTOR.
BY Louis H. Flanders
HIS ATTORNEY IN FACT.

UNITED STATES PATENT OFFICE.

LOUIS H. FLANDERS, OF EDGEWOOD PARK, PENNSYLVANIA, ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

AUTOMATIC LOAD-ADJUSTER.

1,168,263.  Specification of Letters Patent.  Patented Jan. 11, 1916.

Application filed March 15, 1909. Serial No. 483,571.

*To all whom it may concern:*

Be it known that I, LOUIS H. FLANDERS, a citizen of the United States, and a resident of Edgewood Park, in the county of Allegheny and State of Pennsylvania, have made a new and useful Invention in Automatic Load-Adjusters, of which the following is a specification.

This invention relates to a system of electrical distribution in which a load adjuster is employed to maintain an average load upon the generating circuit.

The invention is shown as employing a load adjuster used in connection with a regulating system of electrical distribution employing a generator circuit, a working circuit, a storage battery, a booster controlled by a suitable regulator so arranged as to cause the storage battery to charge and discharge so as to maintain a constant load or constant voltage or constant current upon the generating system. In such systems the regulator is usually adjusted by hand to determine the value of the load maintained approximately constant upon the generating system. This load will remain constant so long as the battery is not overcharged or overdischarged or until the capacity of the booster is exceeded. It is therefore the practice to frequently change the adjustment of the regulator which usually consists in changing the tension of the regulating spring or by cutting in or cutting out resistance in a controlled circuit by means of a rheostat, this adjustment being usually effected by hand. The continued overcharge or overdischarge of the battery is injurious both in point of efficiency and on account of increased depreciation. Attempts have been made to limit this overcharge or overdischarge by limiting the booster voltage, but if the load is fluctuating this method is ineffective as the state of charge or discharge of the battery is not proportional to the voltage under fluctuating load conditions and is only proportional to the specific gravity of the solution or electrolyte of the battery.

One of the objects of my invention is to obviate the disadvantages above enumerated and to provide an average load adjuster which will be entirely automatic in its action.

Another object of the invention is to provide means whereby a load upon the generator circuit will be dependent upon the specific gravity of the electrolyte or solution of the battery used in connection with said circuit. Broadly stated the means of maintaining the average load upon the generator circuit is controlled by an element sensitive in its action to changes in specific gravity of the solution of the battery, an example being a hydrometer placed in the electrolyte of a battery cell so as to rise and fall dependent upon whether the battery is charged or discharged. The means selected for illustration is shown as employing a hydrometer provided with a contact adapted to close the circuit either when the specific gravity of the battery has been brought up to a determined value or when it has dropped to a determined point. The variation of movement of the movable contact between any desired minimum and maximum specific gravity of the battery may be determined by comparing with a standard hydrometer. A shunt circuit controlling the regulator is provided in the generator circuit in which is a rheostat resistance, units of which are adapted to be cut in or cut out depending upon the load and the condition of the battery. When one circuit governed by the hydrometer is closed one or more resistance units of the rheostat may be cut out of the shunt circuit (in the main circuit) but when the other circuit is closed the resistances will be successively cut in until (under certain conditions) the full load is thrown on the generator. When the movable contact is in its mean position, that is fluctuating between the two stationary contacts, the rheostat governing mechanism will not be actuated, so the resistance will be unaffected during the time that the movable contact is fluctuating between the extreme limits of its mean position. Thus as a number of resistance elements of the rheostat are cut out of the shunt circuit to lower the specific gravity of the battery by reducing the generator load the movable contact will drop so as to break the circuit for controlling the rheostat and the rheostat arm will remain in the position which it happened to be at the time the circuit is broken until the specific gravity of the electrolyte drops enough to enable the movable contact to rest upon the lower stationary contact so as to close its circuit and thereby cause the rheostat arm to move in a position to cut in the resistance units to bring the specific gravity of the electrolyte up to the desired value by raising the average load.

The figure in the drawing is diagrammatically a view of a system constructed in accordance with my invention.

Referring now to the drawings by numerals of reference, 1 and 2 designate line wires of different signs of the generator or main line circuit, and in the present instance the one designated by the plus sign is provided with a shunt circuit in which there is a regulator 3 and a rheostat 4. The regulator may be of any preferred construction but I have diagrammatically illustrated a form of regulator merely to afford a comprehensive idea of the operation of a system equipped with my invention. The wire on the plus side of the rheostat is designated by the reference numeral 5 and it is connected to regulator 3 by binding posts or any suitable connection (not shown).

5' is a conductor between the regulator and the rheostat 4. The wire on the minus sign side of the rheostat is designated by the numeral 6. The rheostat 4 is provided with usual resistances 7, the contact arm being connected up to the wire 5' which is in fact a continuation of the wire 5, while the resistance units are connected in series with the wire 6. The rheostat arm is motor driven by a gearing 9 receiving motion from the motor 10. The motor 10 is intermittently driven and the current fed thereto through the wires 11 and 12 may be fed from any source of generation (in this instance the main line wires 1 and 2). The circuit is closed by solenoids of the relays 13 and 13' or 14 and 14', the contacts of the latter solenoids being in the shunt circuit comprising the wires 15 and 16. In the path of the wire 11 is a circuit maker and breaker or timing device designated by the reference numerals 17. This circuit maker and breaker 17 is driven through gearing 18 which receives motion from a constantly driven variable speed motor 19 receiving energy from any suitable source but here shown as receiving the electromotive force from the main line circuit. The maker and breaker 17 may comprise a conducting core 22 on which are two contact carrying rings 23 and 24, one of these being adjustable with relation to the other and said contact rings being held in any adjustable position by means of a fastening device as a screw 25.

The contacts designated by the reference numerals 27 and 28 respectively are carried by the said rings, so that by adjusting the rings with relation to each other the length of contact with the brush 29 may be varied, it being understood that the rings 23 and 24 except for contact portions 27 and 28 are insulated from the core 22. The battery is made up of a plurality of cells, one of which is illustrated in section, the remaining ones being shown in diagram. The battery cells may each comprise the usual receptacle 30 with the usual plates and electrolyte therein. On one of the cells is a suitable stationary contact support 31 which may assume any form adapted to hold stationary contacts, as for example those designated by the reference numerals 32 and 33 determined distances apart. In the cell 30 may be placed a hydrometer 34 having a stem 35 extending through the top of the cell and provided with a contact 36 adapted to aline with both said contacts 32 and 33, said contact 36 being provided with a suitable conductor, $a$, extending down into the electrolyte of the battery cell. Leading from the contact 32 is a conductor 37 of which the coils of the solenoids 13 and 13' form a part, said circuit terminating at a point A and extending to the ground through the wire 38. Leading from the contact 33 is a conductor 39 of which the coils of the solenoids 14 and 14' form a part, said conductor terminating at A and being grounded through the ground wire 38.

The circuits through the conductors 37 and 39 are completed through the battery by means of the ground wire 40. It will be apparent that when either set of solenoids is excited the bridge pieces of the respective relays will be caused to close the gap formed by the contacts in the circuits which these relays control. For example if the solenoids 13 and 13' are energized the bridge pieces 13$^a$ and 13$^b$ will close the gaps formed by the contacts 41 and 41', or if the solenoids 14 and 14' are energized the bridge pieces 14$^a$ and 14$^b$ will close the gaps formed by the contacts 42 and 42', thus the circuits formed by the wires or conductors 43 and 44 will be closed by the relays 13 and 13' or the circuit formed by the wire or conductors 15 and 16 will be closed by the relays 14 and 14'. Suppose the operator to have adjusted the contacts 32 and 33 determined distances apart. If the load on the external circuit becomes excessive the specific gravity of the electrolyte in the battery will become depleted causing the hydrometer to be lowered and the contacts 36 and 33 to close the circuit 39, to energize the coils of the solenoids 14 and 14' and close the circuit formed by the wires 15 and 16. The wire 15 will then be the plus wire and the motor 10 will be intermittently actuated on account of the contact maker and breaker 17 permitting intermittent impulses to be given to the armature of the motor 10 and the arm 8 will move so as to increase the resistance at 7 and continue its movement intermittently until the previously made contact at 33 is broken caused by the average load on the generator being increased due to the change in adjustment of the regulator through the new position of the arm 8 which results in the net discharge of the battery being checked and finally results in the battery receiving the net charge. When this latter condition is reached the specific gravity of the electrolyte will increase and the contact 36 will rest against the contact 32 so as to energize the circuit 37 and the current passing from the opposite side of the armature from the motor 10 will cause said motor to reverse and the arm 8 will have movement imparted to it in a reverse direction to that caused by energizing the circuit 39 and the movement of the arm 8 may intermittently continue until the average load has been reduced and the specific gravity lowered by sufficient amount to break the contact at 32. It will be appreciated in ordinary operation that the battery may charge and discharge intermittently and the external load change through such a range as to cause the specific gravity to fluctuate without changing the load maintained on the generator circuit so long as the change in gravity is such as to prevent the contact 36 from resting against either the contact 32 or 33 and that this range can be varied at pleasure by changing the distance between the contacts to suit the particular conditions under which the system is being used. It will follow that under normal conditions the average external loads being approximately equal to the load in the generator circuit the contact 36 will remain approximately stationary as long as this condition continues and the rheostat arm 8 will rest upon such point as to permit the current to pass directly through the conductor 5. As the average of the fluctuating load in the external circuit becomes greater than the generator load the regulator will cause the battery to discharge an amount equal to the difference between the external load and the generator load and this discharge will continue as long as the load exists. The specific gravity of the solution of electrolyte will fall, the hydrometer will drop, and if the condition still continues, will drop to close the circuit 39.

I have so far described the operation of the system irrespective of any specific form of regulator as regulators have heretofore been used, but in order to make the invention clear I have diagrammatically shown a regulator which may briefly be described as follows: 45 is an ammeter arm pivoted at 70, the coil 46 of which is opposed by a spring 47 as will be well understood. 48 is a contact adapted to contact with the end 49 of the arm 45 when the spring 47 overcomes the torque of the coil 46. From the contact 48 is a conductor 50, passing around a core 51 of an electromagnet and then connected to the minus wire 2. Leading from the arm 45 is a conductor 52 connected to the plus wire of the main line. Thus when contacts 48 and 49 are closed a circuit will be energized through the conductors 50 and 52 so that the electromagnet 51 will attract the armature 53 carried by the vibratory arm 54 which is pivoted at 71 and is provided with a spring 55 opposed to the magnet 51.

The arm 54 is provided with a double contact 56 adapted to contact with either of two contacts 57 or 58 in circuit respectively with the equal and opposite fields 59 and 60 of the booster exciter 61 which co-operates with the booster 62 in the battery circuit comprising the wires 63 and 64. A conductor 65 leads from one of the main line conductors to the equal and opposite fields while a conductor 66 leads from the other main line conductor to the lever or arm 54 so when the circuit formed by the wires 50 and 52 is energized and the contact 53 is attracted by the electromagnet 51 the current will pass through the conductor 66, through the arm 54, contacts 56 and 58, through the field 59 and through the conductor 65. When the contact 53 is not attracted by the electromagnet 51 the current will pass through the conductor 66, arm 54, contacts 56 and 57, field 60, and through the conductor 65 all in a manner well known, so it is thought that it is unnecessary for the purpose of this case to enter into an extended description of the operation of the regulator, booster exciter and booster, as other suitable regulators may be substituted for the one herein described.

The variation of specific gravity takes place slowly in response to sustained changes in the average load, and rapid fluctuations do not produce sufficient change of specific gravity for operating the device.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In a system of electrical distribution, the combination of a storage apparatus and its regulator, electro mechanical means for controlling said regulator and continually operating means for periodically interrupting the circuit of the controlling means, whereby it is made slow acting.

2. In a system of electrical distribution, and electric circuit and its source, a storage battery operatively arranged to deliver and receive energy to and from said circuit, a shunt around a portion of the electric circuit having a regulator and a rheostat therein, a motor for controlling said rheostat, a circuit for said motor, a motor-driven circuit maker and breaker for the motor circuit, and means dependent upon the specific gravity of the solution of the battery for controlling the circuit of the motor.

3. In a system of electrical distribution, an electric circuit and its source, a storage battery in parallel with the circuit, a shunt circuit from the first mentioned circuit and a regulator for the battery in the shunt circuit, a rheostat in the regulator circuit, an actuator for the rheostat, a timing device for the actuator, and a circuit closer for the rheostat actuator dependent for its movement upon the specific gravity of electrolyte in a battery cell.

4. In a system of electrical distribution, an electrical circuit and its source, a storage battery in parallel with the circuit, a regulator for the battery, a rheostat in the regulator circuit, an actuator for the rheostat, a variable timing device for the actuator in the actuator circuit, and a circuit maker and breaker for the actuator circuit dependent for its movement upon the state of battery charge or discharge.

5. In combination, an electric circuit and its source, storage apparatus adapted to receive and deliver energy from and to the circuit, a regulator for controlling the division of load between the source and the storage apparatus, a hydrometer device responsive to the condition of the storage apparatus and adapted to adjust the regulator to vary the load on the source, and means for periodically interrupting the operation of the hydrometer device, whereby it is made slower acting than the regulator.

6. In combination, an electric circuit and its source, a storage battery adapted to receive and deliver energy from and to the circuit, means for controlling the division of load between the source and the battery, an adjusting device responsive to the specific gravity of the electrolyte in the battery and adapted to adjust the controlling means to vary the load on the source, and means for periodically interrupting the operation of the adjusting device, whereby it is made slower acting than the controlling means.

7. In combination, an electric circuit and its source, storage apparatus adapted to receive and deliver energy from and to the circuit, a regulator for controlling the division of load between the source and the storage apparatus, an automatic device adapted to adjust the controlling means to vary the load on the source, and hydrometer means for periodically interrupting the operation of the adjusting device, whereby it is made slower acting than the regulator.

In testimony whereof, I have hereunto subscribed my name this 13th day of March, 1909.

LOUIS H. FLANDERS.

Witnesses:
CHARLES W. McGHEE,
C. W. BALLAY.